United States Patent Office 3,201,200
Patented Aug. 17, 1965

3,201,200
MODIFIED CARBON BLACK PRODUCTION
Andries Voet, Joseph Iannicelli, and Archie C. Teter, Borger, Tex., assignors to J. M. Huber Corporation, Borger, Tex., a corporation of New Jersey
No Drawing. Filed Apr. 10, 1962, Ser. No. 186,364
17 Claims. (Cl. 23—209.4)

This invention relates to the continuous production of carbon black by the decomposition of hydrocarbons at high cracking temperatures, as by well known "furnace" processes, and to modified liquid hydrocarbon compositions useful in such production and for analogous high temperature reactions. More particularly, it relates to a method of carrying out furnace black production whereby the carbon black may be produced quite uniformly with a modified particle structure giving it improved properties for certain uses, without the occurrence of irregularities otherwise found in its pelletizing, dispersing and rubber strengthening characteristics.

Furnace carbon black is produced by the decomposition of vaporized liquid hydrocarbons or of mixtures thereof with normally gaseous hydrocarbons. Use commonly is made of feedstocks composed largely of heavy liquid hydrocarbons, for instance, heavy aromatic fractions or residues of the cracking of petroleum to produce motor fuels. The resulting carbon black, in contradistinction to "channel" black obtained by the decomposition of natural gas at lower temperatures, typically possesses an aggregated or chained particle structure. As is discernible from electron micrographs, the individual or ultimate particles of the carbon have a marked tendency to link together in clusters, agglomerates or chains. These resist being broken apart or tend to re-form if broken apart in the course of dispersion of the product, as in the milling of rubber compounds. Consequently, rubber vulcanizates reinforced with furnace black generally have a considerably greater modulus of elasticity, or less elasticity, than do those similarly reinforced with channel black.

It is well known that the particle structure and consequent rubber reinforcing properties of furnace carbon black are significantly influenced by variations of the composition or the purity of the feedstock from which the black is formed and that the structure and properties of the product can be modified in various ways, for example, by selection of the feedstock according to its composition or by the incorporation of small amounts of foreign substances or additives into the feedstock to give it a desired composition.

It is also known, more particularly, that minute concentrations of alkali metals or of compounds containing them, when present or added as foreign substances in carbon black production, will cause modifications of the particle structure of the product and result in carbon black which, when dispersed in rubber, will give vulcanizates having increased elasticity along with the required strength and resistance to tear and abrasion.

According to U.S. Patent No. 2,665,194, vapors of a liquid hydrocarbon feedstock are condensed upon nuclei of sodium chloride vapor before being carried in admixture with a hydrocarbon gas into a cracking zone for decomposition into carbon black. The carbon black so produced is described as having rubber properties essentially identical to those of blacks produced from natural gas alone.

According to FIAT Final Report No. 1128 (1945), P.B. 88805, page 15, .001% of sodium hydroxide is added to a liquid hydrocarbon before the hydrocarbon is fed into a furnace for decomposition into carbon black.

When an alkali metal in metallic form or in the form of a compound such as a chloride or a hydroxide is brought into a carbon black reaction by known methods, such as by injection or in solution or by addition to a liquid or vaporized hydrocarbon feedstock, it is difficult or impossible to select and control the reaction conditions so precisely that the extent of modification of the product may be chosen at will, or so that the carbon black will be produced continuously with a particular desired structure and uniform pelletizing, dispersing and rubber reinforcing properties.

Among other manifestations of the variability of product qualities are the facts that the voltmeter of the electrostatic precipitator in which the black is separated from the reaction gases tends to fluctuate erratically, and that upon the addition of water at a constant rate to a stream of the separated black, for the formation of pelletizing paste, the level and flow qualities of the paste vary erratically.

We have found that the variability of product qualities is attributable to the lack of a completely uniform, determinate distribution of the alkali metal in the reaction zone of the production furnace and to the existence of a delicate relationship between the concentration of alkali metal maintained in the reaction zone and the structure of the resulting carbon black.

It is important to fix and hold the concentration of alkali metal effective in the reaction exactly at a specified minute value that will give the particular modified structure and properties desired in the product. The concentration required is always extremely small, being, for example, as little as a fraction of one part per million of the weight of the feedstock supplied into the furnace. Minute variations from a specified concentration, whether upward or downward, have marked effects upon properties of the black produced. Yet such variations have not been avoidable in the use of known methods.

It is an object of this invention to provide a method and mineral oil compositions by which troublesome irregularities of production and variations of product qualities heretofore experienced in the modification of furnace carbon black by the action of alkali metals can be fully overcome, and by which any desired extent of such modification can be brought about and can be maintained with precision in continuous furnace operations.

Another object is to enable the effective use of "master" batch techniques in the production of alkali-modified furnace carbon black, so that bulk supplies of feedstocks provided and stored in their natural or as-procured condition can be modified to contain an exactly determined minute concentration of alkali metal while being fed or when ready to be fed to the furnace, by mixing with a production batch or stream of the feedstock a proportioned batch or stream of liquid hydrocarbon carrying in solution a definite concentration of alkali metal far higher than that required for the reaction in the furnaces.

The invention in this latter aspect also enables any particular alkali metal concentration desired for the reaction to be fixed and maintained precisely notwithstanding variations of the concentrations of alkali metal which occur naturally in feedstocks derived from different mineral sources.

Further objects of the invention are to provide modified carbon blacks of improved and assuredly uniform quality and to advance the art of carbon black production.

According to the present invention, it has been discovered that the foregoing and other desirable objects can be achieved by the provision and the use of liquid hydrocarbons, such as liquid hydrocarbon feedstocks suitable for the production of furnace carbon black, into which minute concentrations of alkali metal have been accurately proportioned and homogeneously distributed in the form of oil-soluble mixtures of alkali metal salts of organic acids and oil-soluble free organic acids.

It has also been found that the desired exact liquid hydrocarbon compositions and master batches for use in their preparation can be prepared most advantageously by the use, in admixture with free organic acids effective to solubilize the salts, of the alkali metal salts of lower alkanoic acids, naphthenic acids and sulfonic acids, and especially the 2-ethyl hexanoic acid and naphthenic acid salts. The salts used most effectively according to the invention thus are lower molecular alkanoates, naphthenates and sulfonates of the alkali metals.

While in general the fatty acid salts of multivalent metals are soluble in mineral oils, the same does not hold true with respect to the organic or fatty acid salts of alkali metals. The alkali metal salts of normal fatty acids are too strongly polar to be appreciably soluble in aromatic feedstocks of the type commonly used for furnace carbon black production, and alkali metal salts of the higher fatty acids form gels therein. Generally it is not possible even at elevated temperatures to obtain concentrations of alkali metal above 0.2% by the addition of fatty acid salts alone to mineral oils used for carbon black production; and upon the cooling of oils so treated gelation usually occurs with the tendency to alter the liquid composition and to cause clogging in storage tanks and feed lines. Moreover, the solubility of the salts in low cost non-aromatic oils suitable for economical use in master batches is even lower than their solubility in aromatic feedstocks.

Accordingly, it is in general not feasible to secure the desired continuously uniform or exactly determined concentration of an alkali metal in the reaction zone of a carbon black furnace merely by the addition of fatty acid salts of the metal to the feedstock; and the concentrations of dissolved alkali metal obtainable in hydrocarbon solvents by the direct addition of such salts thereto is not high enough to enable effective use of the resulting liquids in "masterbatching" techniques.

We have found, however, that such distribution can be secured readily, and that masterbatch oils of high and precisely controlled alkali metal content can be prepared and used effectively by the use of organic acid salts of the alkali metals in admixture with oil-soluble free organic acids according to the invention.

In the practice of the invention, the alkali metal salt is mixed with the solubilizing free organic acid and the mixture is then added in a definite proportion to the feedstock, or to a master batch of a carrier or solvent oil that is to be proportioned into the feedstock for incorporation of the additive thereinto. The oil used for the preparation of such a master batch may be, for example, kerosene, fuel oil, diesel oil, petroleum, or a portion of the furnace feedstock itself, such as an aromatic gasoline cracking residue.

The free organic acids effective to solubilize the alkali metal salts include a wide variety of oil-soluble fatty acids. Among them are substituted, unsubstituted, saturated, unsaturated, unbranched, and branched chain fatty acids. When higher fatty acids containing more than 8 carbon atoms are used, such as decanoic, lauric, myristic, palmitic, oleic or stearic acid, the mixtures obtained tend to form gels in the carrier oils unless the oils are heated considerably, for example, to temperatures of 80° to 150° C. On the other hand, by the use of lower fatty acids, for example, butyric, bromobutyric, 3-chloropropionic, pentanoic, 2-ethyl hexanoic, 2-bromo hexanoic, heptanoic and octanoic acids, much greater solubilizing effects are obtained.

It has been found that mixtures of the alkali metal organic acid salts with certain lower fatty acids can be dissolved in the oils at room temperatures to provide, without heating or gel formation, high concentrations of alkali metal uniformly distributed and accurately proportioned throughout the oil. Butyric acids and certain lower fatty acids of branched chain structure have been found exceptionally advantageous in this respect, especially isovaleric acid, 2-ethyl hexanoic acid and petroleum naphthenic acids of the formula $R(CH_2)_nCOOH$, where $n$ is a whole number and R is a naphthenic radical such as cyclopentyl, cyclohexyl, or the like. By the use of these acids with 2-ethyl hexanoates, naphthenates or sulfonates of the alkali metals, mixtures are obtained which at room temperature will dissolve in the carrier oils to form stable solutions containing 25% or more by weight of the alkali metal salt.

The 2-ethyl hexanoic and naphthenic acids are preferred acids for commercial practices of the invention. Mixtures of these acids with alkali metal 2-ethyl hexanoates or alkali metal naphthenates have been found to be miscible at room temperature, in all proportions, with feedstocks and other aliphatic and aromatic hydrocarbon oils.

The amount of the free organic acid to be used in the mixtures can be varied widely, depending upon the extent of the solubilizing effect required. The maximum effect appears to be realized when the acid is used in a molar ratio of 1 to 1 to the alkali metal salt. But larger amounts of the acid may be used without harm, and smaller amounts down to as little as about 10% of the molar equivalent of the salt have significant solubilizing effects. Since an amount equivalent to 25% of the quantity of salt is often quite satisfactory, the mixtures generally should contain from 20% to 100% or more of the amount of the free acid equivalent to their content of the alkali metal salt.

The feedstock modified according to the invention, whether prepared by direct addition of the salt-acid mixture or by addition of a masterbatch solution of the mixture, is easily made to contain the alkali metal in a perfectly uniform and correctly proportioned distribution throughout the oil. When it is vaporized and enters into the pyrolysis reaction in the furnace its alkali metal content passes through the reaction and into the carbon black with the same perfect distribution. Thus, the concentration of the alkali metal that will be effective for modification of the product can be selected and maintained certainly and continuously at any desired value, including any of the extremely minute values at or approaching the threshold of the full effectiveness of the alkali metal or any higher value that may be desired; and the resulting carbon black is continuously and predictably uniform in its structure and its related pelletizing, dispersing and rubber reinforcing properties.

Furthermore, no impurity other than the pre-set concentration of alkali metal is introduced into the product, since the organic acid components carrying and mixed with the alkali metal are themselves pyrolyzed in the furnace so as to be a source of carbon or heating gases only.

The 2-ethyl hexanoic acid salts can be used quite advantageously according to the invention, as typified, for example, by cesium 2-ethyl hexanoate, rubidium 2-ethyl hexanoate, lithium 2-ethyl hexanoate, potassium 2-ethyl hexanoate and sodium 2-ethyl hexanoate. Potassium 2-ethyl hexanoate can be obtained commercially. Any of the 2-ethyl hexanoic acid salts can be prepared in a mixture suitable for use according to the invention by simply heating and stirring a solution of the hydroxide, oxide, carbonate or acetate of the alkali metal with an excess of 2-ethyl hexanoic acid in solution. The heating results in the formation of the alkali metal 2-ethyl hexanoate in admixture with the solubilizing acid, and it is accompanied by the displacement of $H_2O$, $CO_2$ or acetic acid which can be driven out of the reaction mixture by continued heating.

The various mixtures of organic salts and acids herein set forth can be used to secure remarkably uniform effects upon the quality of the carbon black. While only a minute proportion of any of them is ordinarily required in the feedstock in order to obtain a desired modification of the carbon black with minimal impurification of the product, any of a wide range of proportions from as little as 0.1 part per million up to 10,000 parts per million or even a higher minor proportion, calculated as alkali metal and based upon the weight of the feedstock, can be selected and used as desired. The minimal concentration, however, is considerably smaller in the use of cesium or potassium salts than it is in the use of salts of sodium or lithium.

The selectability and the continuous uniformity of carbon black structure and properties, as obtained according to the invention, are highly advantageous for commercial carbon black production. Their value in eliminating occurrences of off-grade products and in assuring that the modified black will fulfill use specifications is self-evident. They also have another important advantage, in that the product can be wet pelletized continuously by the addition of water to a stream of it at a constant rate, without encountering troublesome variations of the level or the flow of the resulting paste; whereas, in the wet pelletizing of carbon black that is not continuously uniform in particle structure the flow and level of the paste vary erratically and adjustments of the operations are required continually in order to avoid the formation of off-grade pellets.

The practice and advantages of the invention will be further apparent from the following illustrative examples.

*Example 1*

Carbon black production was carried out by the use of a furnace substantially of the type disclosed in U.S. Patent No. 2,623,811 to Ira Williams, with the continuous introduction of feedstock into the furnace at the rate of 200 gallons per hour.

The feedstock was a heavy residual oil from the cracking of petroleum to produce motor fuel, of the type commonly used to produce a standard ISAF carbon black. The carbon black obtained by the use of this feedstock without modification had an oil absorption of 98 cc. of linseed oil per 100 grams of black and a pellet density of 23.7 lbs. per cubic foot, as determined by A.S.T.M. standard method D1513.

A "master" batch of modified feedstock was prepared by adding and stirring a mixture of potassium 2-ethyl hexanoate and 2-ethyl hexanoic acid into a portion of the normal feedstock to obtain in the oil an additive concentration equal to 0.5% of potassium. The hexanoate dissolved readily and formed a completely homogeneous solution. The mixture was prepared by gradually adding a solution of 195 g. of KOH in 250 ml. of water to a solution of 1,000 g. of 2-ethyl hexanoic acid and stirring the mixture for one hour while heating it to 140° C. to distill off water.

The master batch was carefully proportioned into the feedstock stream flowing to the preheater of the furnace, by means of a positive displacement proportioning pump which delivered the potassium salt solution at the rate of 1.0 gallon per hour. Complete blending of the mixed oils was obtained in the pipe line leading to the furnace oil intake, as was verified by careful tests. The modified feedstock contained 0.0025% of potassium in completely homogeneous distribution.

The carbon black resulting from the pyrolysis of the modified feedstock was obtained continuously with a notably reduced structure and with modified properties which underwent no appreciable deviations during the production. Its oil absorption was 81 g./100 g. and its pellet density was 29.0 lbs./cu. ft.

The continuous uniformity of the modified furnace product was clearly manifested by the facts that (1) the voltmeter of the electrostatic precipitator in which the black was separated from the reaction gases remained steady during the production, and (2) upon the addition of water to the stream of separated black at a constant rate for the continuous formation of pelletizing paste, the level and flow of the paste remained constant.

*Example 2*

The carbon black production was carried out as described in Example 1, except that a mixture of 100 parts by weight of sodium 2-ethyl hexanoate with 100 parts of a petroleum naphthenic acid having a molecular weight of 220 was dissolved in the master batch, instead of the potassium salt mixture, so as to give the master batch a concentration of additive equivalent of 7% of sodium. The resulting concentration in the feedstock was 0.014% of sodium. The sodium salt was prepared by neutralizing a solution of 2-ethyl hexanoic acid with NaOH and driving off water.

The resulting carbon black was obtained continuously with a uniform low structure and other advantageous qualities described. Its oil absorption was 91 g./100 g. and its pellet density was 27.0 lbs./cu. ft.

*Example 3*

The carbon production was carried out as described in Example 1, except that, after 115 parts of rubidium carbonate was stirred into 2000 g. of naphthenic acid and heated at 70° C. until gas evolution ceased, 100 parts of the resulting solution was dissolved in 1200 parts of mineral oil and this was proportioned into feedstock at such a rate that the feedstock contained 0.0007% of rubidium.

The resulting carbon black was obtained continuously with a uniform low structure and other advantageous properties described. Its oil absorption was 92 g./100 g. and its pellet density was 26.5 lbs./cu. ft.

*Example 4*

The carbon production was carried out as described in Example 1, except that the master batch was prepared as follows: A solution of 150 parts of cesium carbonate in 150 parts of water was added to 1800 parts of rapidly stirred 2-ethylhexanoic acid. After stirring for one hour, the mixture was boiled until the water layer disappeared. This solution was dissolved in kerosene to give a master batch containing 2% cesium. The resulting concentration in the feedstock was 0.0011% of cesium.

The resulting carbon black was obtained continuously with a uniform low structure and other advantageous qualities described. Its oil absorption was 74 g./100 g. and its pellet density was 31.0 lbs./cu. ft.

*Example 5*

The carbon production was carried out as described in Example 1, except that the feedstock was prepared as follows: A solution of 50.6 parts of LiOH in 300 parts water was added to 302 parts of 2-ethylhexanoic acid and heated at 50° C. with stirring until a solid phase began to separate. Then 500 parts of naphthenic acid was added and the mixture was heated at 50° C. until all solids dissolved. This solution was dissolved in Conoco feedstock, an extraction residue obtained by the Conoco process of petroleum cracking, to give a concentration of 0.006% of lithium.

The resulting carbon black was obtained continuously with a uniform low structure and other advantageous qualities described. Its oil absorption was 107 g./100 g. and its pellet density was 24 lbs./cu. ft.

*Example 6*

The carbon black production was carried out as described in Example 1, except that a mixture of 100 parts by weight of a potassium salt of petroleum naphthenic acid, prepared by neutralization of a naphthenic acid having a molecular weight of 263 with KOH, and 50 parts by weight of n-butyric acid was dissolved in a diesel oil so as to give a master batch of a concentration equivalent to 1.0% metallic potassium. The resulting concentration in the feedstock was 0.005% of potassium in completely homogeneous distribution.

The resulting carbon black was obtained continuously with a uniform low structure and other advantageous qualities described. Its oil absorption was 66 g./100 g. and its pellet density 31.5 lbs./cu. ft.

*Example 7*

The carbon black production was carried out as described in Example 1, except that a mixture of 100 parts by weight of a sodium sulfonate, prepared by neutralization of a sulfonic acid derived from petroleum sulfonation having a molecular weight of 460, with NaOH, and 30 parts by weight of a naphthenic acid having a molecular weight of 220 was dissolved in diesel oil so as to give a master batch of a concentration equivalent to 2.80% of metallic sodium. The resulting concentration in the feedstock was 0.014% of sodium in homogeneous distribution.

The resulting carbon black was obtained continuously with a uniform low structure and other advantageous qualities described. The oil absorption was 82 g./100 g. and its pellet density 29.3 lbs./cu. ft.

*Example 8*

The carbon black production was carried out as described in Example 1, except that a mixture of 100 parts by weight of a potassium 2-ethyl hexanoate and 50 parts by weight of isovaleric acid was dissolved in kerosene so as to provide a master batch of a concentration equivalent to 0.32% metallic potassium. The resulting concentration in the feedstock was 0.0016% of potassium in homogeneous distribution.

The resulting carbon black was obtained continuously with a uniform low structure and other advantageous qualities described. Its oil absorption was 85 g./100 g. and its pellet density 28.4 lbs./cu. ft.

*Example 9*

The carbon black production was carried out as described in Example 1, except that a mixture of 100 parts by weight of potassium stearate and 100 parts by weight of a naphthenic acid having a molecular weight of 236 was dissolved in a diesel oil so as to give a master batch of a concentration of 0.24% metallic potassium. The resulting concentration in the feedstock was 0.0012%. The resulting carbon black was obtained continuously with a uniform low structure and other advantageous qualities as described. Its oil absorption was 88 g./100 g. and its pellet density 27.5 lbs./cu. ft.

*Example 10*

The carbon black production was carried out as described in Example 1, except that a mixture of 100 parts by weight of sodium 2-ethyl hexanoate and 100 parts by weight of oleic acid was dissolved in a highly aromatic feedstock so as to give a master batch of a concentration equivalent to 4.1% metallic sodium. The resulting concentration in the feedstock used for carbon black manufacture was 0.0210% of sodium in completely homogeneous distribution.

The resulting carbon black was obtained continuously with a uniform low structure and other advantageous qualities described. Its oil absorption was 79 g./100 g. and its pellet density 30.2 lbs./cu. ft.

While the present method is useful in the production of carbon black from the residual oil obtained from the cracking of hydrocarbons to produce motor fuels, it is not restricted to such oils. Other liquid hydrocarbons, such as crude petroleum oil, kerosene, gasoline, heavy or light naphthas, recycle oils, coal tar, etc. may be used. Nor is the method restricted to use with furnaces of any particular design or type.

We claim:

1. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of an alkali metal salt of an organic acid selected from the group consisting of alkyl and cycloalkyl carboxylic and sulfonic acids and an oil-soluble free fatty acid that enhances the oil-solubility of said salt.

2. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of a lower molecular alkali metal alkanoate and an oil-soluble free lower-molecular fatty acid that enhances the oil-solubility of said alkanoate.

3. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of an alkali metal 2-ethyl hexanoate and an oil-soluble free lower molecular fatty acid selected from the group consisting of alpha hexanoic, petroleum naphthenic, isovaleric and butyric acids.

4. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of an alkali metal naphthenate and an oil-soluble free lower-molecular fatty acid selected from the group consisting of alpha hexanoic, petroleum naphthenic, isovaleric and butyric acids.

5. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of an alkali metal sulfonate and an oil-soluble free lower-molecular fatty acid selected from the group consisting of alpha hexanoic, petroleum naphthenic, isovaleric and butyric acids.

6. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises feeding to said furnace as said feedstock a liquid hydrocarbon having homogeneously dissolved therein a precisely proportioned minute concentration of a mixture of an alkali metal 2-ethyl hexanoate and oil-soluble free fatty acid that enhances the oil-solubility of said hexanoate.

7. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises feeding to said furnace as said feedstock a liquid hydrocarbon having homogeneously dissolved therein a precisely proportioned minute concentration of a mixture of an alkali metal naphthenate and oil-soluble free fatty acid that enhances the oil-solubility of said naphthenate.

8. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises feeding to said furnace as said feedstock a liquid hydrocarbon having homogeneously dissolved therein a precisely proportioned minute concentration of a mixture of an alkali metal sulfonate and oil-soluble free fatty acid that enhances the oil-solubility of said sulfonate.

9. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of an alkali metal 2-ethyl hexanoate and free 2-ethyl hexanoic acid.

10. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises homogeneously dissolving in said feedstock a precisely proportioned minor amount of a mixture of an alkali metal 2-ethyl hexanoate and a petroleum naphthenic acid.

11. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises adding to and homogeneously dissolving in a batch of liquid hydrocarbon a precisely proportioned amount of a mixture of an alkali metal salt of an organic acid selected from the group consisting of alkyl and cycloalkyl carboxylic and sulfonic acids and an oil-soluble free fatty acid that enhances the oil-solubility of said salt, and precisely proportioning and thoroughly mixing the resulting solution into said feedstock.

12. The method of claim 11, said salt being selected from the group consisting of lower-molecular alkanoates, naphthenates and sulfonates of the alkali metals.

13. The method of claim 11, said salt being an alkali metal 2-ethyl hexanoate.

14. The method of claim 11, said salt being an alkali metal naphthenate.

15. The method of claim 11, said acid being a lower-molecular fatty acid selected from the group consisting of alpha hexanoic, petroleum naphthenic, isovaleric and butyric acids.

16. The method of claim 11, said mixture being a mixture of alkali metal 2-ethyl hexanoate and 2-ethyl hexanoic acid.

17. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises adding to and homogeneously dissolving in a batch of liquid hydrocarbon a precisely proportioned amount of a mixture of an alkali metal salt of an organic acid selected from the group consisting of alkyl and cycloalkyl carboxylic and sulfonic acids and an oil-soluble free fatty acid that enhances the oil-solubility of said salt, said amount providing in said batch a predetermined concentration of alkali metal many times greater than the concentration thereof required for modifying said structure, and precisely proportioning and thoroughly mixing the resulting solution into a quantity of said feedstock many times greater than that of said solution to provide in the feedstock precisely said required concentration of alkali metal.

References Cited by the Examiner

UNITED STATES PATENTS

| | | | |
|---|---|---|---|
| 3,010,794 | 11/61 | Friauf et al. | 23—209.4 |
| 3,010,795 | 11/61 | Friauf et al. | 23—209.4 |
| 3,013,869 | 12/61 | Kissa | 44—66 |
| 3,041,154 | 6/62 | Sandy et al. | 44—66 |

MAURICE A. BRINDISI, *Primary Examiner.*